(12) United States Patent
Matsumoto

(10) Patent No.: US 7,138,481 B2
(45) Date of Patent: Nov. 21, 2006

(54) PROCESS FOR PRODUCING POLYESTER RESIN

(75) Inventor: Hitoshi Matsumoto, Mie (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 11/009,030

(22) Filed: Dec. 13, 2004

(65) Prior Publication Data

US 2005/0239997 A1 Oct. 27, 2005

Related U.S. Application Data

(63) Continuation of application No. PCT/JP03/06407, filed on May 22, 2003.

(30) Foreign Application Priority Data

Jun. 12, 2002 (JP) .............................. 2002-171708

(51) Int. Cl.
*C08G 63/00* (2006.01)

(52) U.S. Cl. ...................... 528/271; 525/437; 525/444; 528/298

(58) Field of Classification Search ................ 525/437, 525/444; 528/272, 298
See application file for complete search history.

(56) References Cited

U.S. PATENT DOCUMENTS 5,510,454 A * 4/1996 Stouffer et al. .......... 528/308.1
5,714,262 A * 2/1998 Stouffer et al. ............. 428/402
5,830,982 A * 11/1998 Stouffer et al. .......... 528/308.3
6,335,422 B1 * 1/2002 Schiavone ................... 528/300

FOREIGN PATENT DOCUMENTS

WO        WO 96/22319        7/1996

* cited by examiner

*Primary Examiner*—Terressa Boykin
(74) *Attorney, Agent, or Firm*—Oblon, Spivak, McClelland, Maier & Neustadt, P.C.

(57) ABSTRACT

A polyester resin prepared by polycondensing a dicarboxylic acid component containing terephthalic acid or derivative thereof with a diol component containing ethylene glycol through esterification or transesterification, thereby producing a melt polymerization polymer and subjecting the melt polymerization polymer to solid-phase polycondensation, wherein (1) the melt polymerization polymer contains comonomer units other than terephthalic acid units and ethylene glycol units in an amount of 5.5 or less, and whose intrinsic viscosity ranges from 0.08 dL/g to 0.50 dL/g and which has an apparent crystallite size smaller than 9 nm, and wherein (2) the melt polymerization polymer is subjected to solid-phase polycondensation at a temperature which is higher by at least 140° C. than the glass transition temperature of the melt polymerization polymer and is not higher than the melting point of the polymer to thereby obtain a polyester resin having an apparent crystallite size smaller than 9 nm.

14 Claims, No Drawings

US 7,138,481 B2

PROCESS FOR PRODUCING POLYESTER RESIN

CROSS-REFERENCE TO A RELATED APPLICATION

The present application is a continuation of International Application PCT/JP03/06407 filed on May 22, 2003, which claims priority to Japanese Patent Application No. 2002-171708, filed on Jun. 12, 2002.

FIELD OF THE INVENTION

The present invention relates to a process for producing a polyester resin. More particularly, the invention relates to a process in which the solid-phase polycondensation of a polyester is conducted at an exceedingly high rate.

BACKGROUND ART

Polyester resins, in particular poly(ethylene terephthalate) (hereinafter sometimes abbreviated as PET), which is produced from terephthalic acid and ethylene glycol as raw materials, are extensively used as many materials and products such as, e.g., fibers, textiles, molding resins, and beverage bottles.

In order for a polyester resin to have the moldability and mechanical properties which are necessary for those applications, it should have a degree of polymerization increased to a given level. A method in wide industrial use for this purpose comprises subjecting raw materials for a polyester to melt polycondensation to obtain a polycondensation product having a relatively high viscosity and subsequently subjecting the polycondensation product to solid-phase polycondensation. However, the solid-phase polycondensation in this method heretofore in use necessitates a relatively long time period. There is hence a desire for a production process attaining better productivity.

A process for polyester resin production has been proposed as a process with improved productivity. This process comprises subjecting raw material monomers for a polyester to melt polycondensation to obtain a melt polymerization polymer having a relatively low degree of polymerization and subjecting this melt polymerization polymer to solid-phase polycondensation. For example, JP-T-10-512608 (WO 96/22319) discloses a process in which a lowly polymerized melt polymerization polymer obtained by melt polycondensation and having an average degree of polymerization of from about 5 to about 35 (intrinsic viscosity of about from 0.10 to 0.36dL/g) is crystallized so as to result in a crystallite size of 9 nm or larger and then subjected to solid-phase polycondensation. (The term "JP-T" as used herein means a published Japanese translation of a PCT patent application.) There is a statement therein to the effect that according to this process, polycondensation can be initiated at a higher temperature, e.g., 230° C., preferably at 240° C., to directly obtain the target polymer. However, our investigations have revealed that a satisfactory rate of solid-phase polycondensation is not always obtained possibly because the degree of polymerization at the time when the solid-phase polycondensation is initiated is too low or because crystals grow to inhibit the movement of molecules, although the reasons are unclear.

On the other hand, U.S. Pat. No. 6,284,866 discloses a process for producing a copolyester for use as bottles reduced haze in low-temperature. In this process, a melt polymerization polymer which is a polyester in which the sum of a dicarboxylic acid component copolymerized (mol %) and a diol component copolymerized (mol %) is 6 or more and which has an intrinsic viscosity of from 0.25 to 0.40 dL/g is subjected to solid-phase polycondensation under specific conditions. However, the process disclosed in that patent document is not always industrially advantageous because the solid-phase polycondensation is conducted with a rotary-vacumn tumble dryer and is solid-phase polycondensation under high vacuum. Furthermore, our investigations revealed that the melt polymerization polymer has a relatively low melting point because of the too high proportion of comonomer units and, hence, a high temperature cannot be used for the solid-phase polycondensation when it is not conducted under high vacuum. Consequently, the rate of solid-phase polycondensation is low and the process is not efficient when it is not conducted under high vacuum.

An object of the invention is to provide a process in which the solid-phase polycondensation of a polyester is conducted at an exceedingly high rate and a polyester is hence produced with satisfactory productivity. Another object of the invention is to provide a process in which the solid-phase polycondensation of a polyester can be carried out at a high rate without the necessity of using special conditions, e.g., high vacuum, and a polyester is produced with satisfactory productivity without posing any problem concerning handling, such as, e.g., the fusion bonding of the resultant polyester resin to itself or the adhesion of the polyester resin to the reactor.

DISCLOSURE OF THE INVENTION

As a result of intensive investigations made by the present inventor in order to overcome the problems described above, it has been found that those objects can be accomplished by regulating the amount of comonomer, intrinsic viscosity, and apparent crystallite size of a melt polymerization polymer to be subjected to solid-phase polymerization and controlling the solid-phase polycondensation temperature in conducting the solid-phase polycondensation. The invention has been thus achieved.

An essential point of the invention resides in a process for producing a polyester resin, which comprises subjecting a dicarboxylic acid component containing terephthalic acid or an ester-forming derivative thereof as the main component to polycondensation with a diol component containing ethylene glycol as the main component through esterification or transesterification to thereby produce a melt polymerization polymer and subjecting the melt polymerization polymer to solid-phase polycondensation, characterized in that:

(1) a melt polymerization polymer in which the amount of comonomer units other than terephthalic acid units and ethylene glycol units is 5.5 or less and which has an intrinsic viscosity of from 0.08 dL/g to 0.50 dL/g and an apparent crystallite size smaller than 9 nm is obtained and (2) the melt polymerization polymer is subjected to solid-phase polycondensation at a temperature which is higher by at least 140° C. than the glass transition temperature of the melt polymerization polymer and is not higher than the melting point of the polymer to thereby obtain a polyester resin having an apparent crystallite size smaller than 9 nm.

Another essential point resides in a process for producing a polyester resin, which comprises subjecting a dicarboxylic acid component containing terephthalic acid or an ester-forming derivative thereof as the main component to polycondensation with a diol component containing ethylene glycol as the main component through esterification or transesterification to thereby produce a melt polymerization polymer and subjecting the melt polymerization polymer to solid-phase polycondensation, characterized in that:

(1) a melt polymerization polymer in which the amount of comonomer units other than terephthalic acid units and ethylene glycol units is 5.5 or less and which has an intrinsic viscosity of from 0.08 to 0.50 dL/g and an apparent crystallite size smaller than 9 nm is (2) subjected to solid-phase polycondensation at a temperature which is higher by at least 140° C. than the glass transition temperature of the melt polymerization polymer and is not higher than the melting point of the polymer while keeping the apparent crystallite size of the melt polymerization polymer smaller than 9 nm.

BEST MODE FOR CARRYING OUT THE INVENTION

The melt polymerization polymer in the process for polyester resin production of the invention is a melt polymerization polymer which comprises ethylene terephthalate units as the main structural repeating units and has been produced by subjecting a dicarboxylic acid component containing terephthalic acid or an ester-forming derivative thereof as the main component and a diol component containing ethylene glycol as the main component to esterification or transesterification and then subjecting the resultant polymer to melt polycondensation. In this polyester resin, the amount of comonomer units other than terephthalic acid units and ethylene glycol units is 5.5 or less. The term "the amount of comonomer units other than terephthalic acid units and ethylene glycol units is 5.5 or less" means that when the proportion (mol %) of units of any dicarboxylic acid other than terephthalic acid or its ester-forming derivative to all dicarboxylic acid component units is expressed by A and the proportion (mol %) of units of any diol other than ethylene glycol to all diol component units is expressed by B, then A+B is 5.5 or less. This amount of comonomer unit is preferably 4.5 or less. In case where the amount of comonomer unit exceeds 5.5, the polyester resin has a lowered melting point and this results in limitations on solid-phase polycondensation temperature and hence in a reduced polycondensation rate. In addition, since this polyester resin has poor heat resistance, the effect of stretching and heat setting is not sufficiently produced when the polyester resin is stretched and heat-set during molding in order to improve, in particular, strength and heat resistance.

Examples of the ester-forming derivative of terephthalic acid include alkyl esters of terephthalic acid in which each alkyl has about from 1 to 4 carbon atoms, such as the dimethyl ester of terephthalic acid, halides, and the like. Examples of dicarboxylic acids other than terephthalic acid or ester-forming derivatives thereof include aromatic dicarboxylic acids such as phthalic acid, isophthalic acid, 1,3-phenylenedioxydiacetic acid, 4,4'-diphenyldicarboxylic acid, 4,4'-diphenyl etherdicarboxylic acid, 4,4'-diphenyl ketonedicarboxylic acid, 4,4'-diphenoxyethanedicarboxylic acid, 4,4'-diphenyl sulfonedicarboxylic acid, and 2,6-naphthalenedicarboxylic acid; alkyl esters of aromatic dicarboxylic acids in which each alkyl has about from 1 to 4 carbon atoms, such as the dimethyl ester of 2,6-naphthalenedicarboxylic acid, and halides of aromatic dicarboxylic acids; alicyclic dicarboxylic acids such as hexahydroterephthalic acid; aliphatic dicarboxylic acids such as succinic acid, glutaric acid, adipic acid, pimelic acid, suberic acid, azelaic acid, sebacic acid, undecanedicarboxylic acid, and dodecanedicarboxylic acid; and alkyl esters of these alicyclic dicarboxylic acids or aliphatic dicarboxylic acids in which the alkyl groups each have about from 1 to 4 carbon atoms, halides of these acids, and the like.

Examples of diols other than ethylene glycol include aliphatic diols such as trimethylene glycol, tetramethylene glycol, hexamethylene glycol, decamethylene glycol, neopentyl glycol, 2-ethyl-2-butyl-1,3-propanediol, diethylene glycol, triethylene glycol, polyethylene glycol, and polytetramethylene ether glycol; alicyclic diols such as 1,4-cyclohexanediol and 1,4-cyclohexanedimethylol; aromatic diols such as xylylene glycol; and ethylene oxide adducts, propylene oxide adducts, or the like of 2,2-bis(4'-hydroxyphenyl)propane.

Furthermore, one or more of monofunctional components such as, e.g., stearyl alcohol, stearic acid, and benzoic acid, polyfunctional components having a functionality of 3 or higher, such as trimellitic acid, trimesic acid, pyromellitic acid, trimethylolethane, trimethylolpropane, glycerol, and pentaerythritol, and the like may have been used as a comonomer component.

Since the amount of comonomer unit in the melt polymerization polymer in the invention is in the range shown above, the proportion of units of terephthalic acid or ester-forming derivative thereof to all dicarboxylic acid component units is preferably 94.5% by mole or higher, more preferably 96% by mole or higher. On the other hand, the proportion of ethylene glycol units to all diol component units is preferably 94.5% by mole or higher, more preferably 96% by mole or higher.

The melt polymerization polymer in the invention is produced basically by an ordinary process for polyester resin production. Namely, the one or more dicarboxylic acids comprising terephthalic acid or an ester-forming derivative thereof as the main component and the one or more diols comprising ethylene glycol as the main component are used usually in such a proportion that the dicarboxylic acid/diol ratio is from 1/1 to 1/2(by mole). The reactants are subjected to esterification in an esterification vessel with stirring at a temperature of usually about from 240 to 280° C. and a pressure of usually from ordinary pressure to an elevated pressure of about 0.4 MPa for about from 1 to 10 hours. Alternatively, the reactants are subjected to transesterification in the presence of a transesterification catalyst. Thereafter, the low-molecular polyester obtained as an esterification product or transesterification product is transferred to a polycondensation vessel and subjected to melt polymerization in the presence of a polycondensation catalyst at a temperature of usually about from 250 to 290° C. while gradually reducing the pressure from ordinary pressure finally to a reduced pressure of usually about from 1,333 to 13.3 Pa.

This melt polycondensation is conducted with stirring for such a period as to result in an intrinsic viscosity in the range of from 0.08 to 0.50 dL/g, usually for about from 0.5 to 5 hours, to thereby produce the melt polymerization polymer. It should, however, be noted that in the melt polymerization polymer according to the invention, the amount of comonomer units other than terephthalic acid units and ethylene glycol units is 5.5 or less as stated above. Consequently, the terephthalic acid component, ethylene glycol component, and comonomer components other than the terephthalic acid component and ethylene glycol component are used so that the amount of comonomer unit results in 5.5 or less.

Although the reactions described above may be conducted continuously or batchwise, continuous operations are preferred. The esterification vessel and polycondensation vessel each may be a single-stage or multistage vessel. In the case where the low-molecular polyester described above is formed into particles and these particles are subjected as a melt polymerization polymer to solid-phase polycondensation, the melt polycondensation may be omitted.

Although a catalyst need not be especially used in the esterification, a known catalyst may be used according to need. Examples thereof include germanium compounds such as germanium dioxide, germanium tetroxide, germanium hydroxide, germanium oxalate, germanium tetraethoxide, and germanium tetra-n-butoxide, antimony compounds such as antimony trioxide, antimony pentoxide, antimony acetate, and antimony tris (ethylene glycoxide), and titanium compounds such as titanium tetraethoxide, titanium tetra-n-propoxide, titanium tetraisopropoxide, titanium tetra-n-butoxide, titanium oxalate, and titanium potassium oxalate.

As the transesterification catalyst may be used one or more members selected from compounds of metals such as titanium, magnesium, calcium, manganese, lithium, and zinc. Specific examples thereof include organic acid salts, alcoholates, carbonates, and the like of these metals. Preferred of these are magnesium acetate, calcium acetate, manganese acetate, lithium acetate, and the like.

The amount of the transesterification catalyst to be used is usually about from 1 to 200 ppm of the polyester resin to be obtained, in terms of the content of metal atoms derived from the catalyst.

As the polycondensation catalyst may be used germanium compounds such as germanium dioxide, germanium tetroxide, germanium hydroxide, germanium oxalate, germanium tetraethoxide, and germanium tetra-n-butoxide, antimony compounds such as antimony trioxide, antimony pentoxide, antimony acetate, and antimony tris(ethylene glycoxide), titanium compounds such as titanium tetraethoxide, titanium tetra-n-propoxide, titanium tetraisopropoxide, titanium tetra-n-butoxide, titanium oxalate, and titanium potassium oxalate, cobalt compounds such as cobalt formate, cobalt acetate, cobalt stearate, cobalt oxalate, cobalt carbonate, and cobalt bromide, tin compounds such as tin acetate, tin oxalate, and tin bromide, and the like. These may be used alone or in combination of two or more thereof. It is preferred to use an oxide, inorganic salt, organic acid salt, or alcoholate compound of at least one metal selected from germanium, antimony, and titanium. The amount of the polycondensation catalyst to be used is usually about from 1 to 500 ppm of the polyester resin to be obtained, in terms of the content of metal atoms derived from the catalyst.

The esterification or transesterification and the polycondensation can be conducted in the presence of a phosphorus compound as a stabilizer. Examples thereof include phosphoric esters such as trimethyl phosphate, triethyl phosphate, tri-n-butyl phosphate, trioctyl phosphate, triphenyl phosphate, and tricresyl phosphate, phosphorous esters such as triphenyl phosphite, trisdodecyl phosphite, and trisnonylphenyl phosphite, acid phosphoric esters such as methyl acid phosphate, ethyl acid phosphate, isopropyl acid phosphate, butyl acid phosphate, dibutyl phosphate, monobutyl phosphate, and dioctyl phosphate, phosphoric acid, phosphorous acid, hypophosphorous acid, and polyphosphoric acid. Furthermore, the reactions can be conducted in the presence of a basic compound as an ether bond formation inhibitor. Examples thereof include tertiary amines such as triethylamine, tri-n-butylamine, and benzyldimethylamine, quaternary ammonium hydroxides such as tetraethylammonium hydroxide, tetra-n-butylammonium hydroxide, and trimethylbenzylammonium hydroxide, lithium carbonate, sodium carbonate, potassium carbonate, sodium acetate, and magnesium acetate.

The amount of the phosphorus compound to be used is usually about from 1 to 200 ppm of the polyester resin to be obtained, in terms of the content of phosphorus atoms derived from the phosphorus compound. It is preferred to use a combination of, in particular, a titanium compound, a magnesium compound, and a phosphorus compound among the catalysts and additives shown above. In this case, the proportions of these compounds to be used may be in the following ranges.

T: 0.02–0.6 mol (per ton of the polyester resin)
M: 0.04–0.6 mol (per ton of the polyester resin)
P: 0.02–4 mol (per ton of the polyester resin)
(T: total amount of titanium atoms, M: total amount of magnesium atoms, P: total amount of phosphorus atoms)

Examples of preferred combinations of catalysts and additives and examples of the proportions of these components to be used include those shown in EP 1273610-A1.

The melt polymerization polymer obtained by the melt polycondensation may be ejected outward through minute openings formed in the bottom of the polycondensation vessel to form the polymer into small particles, or may be discharged in the form of droplets through a discharge orifice formed in the bottom of the polycondensation vessel into air or water. Alternatively, the melt polycondensation polymer may be discharged in the form of strands and then cut with a cutter with or after water cooling to obtain the polymer in the form of pellets. It is also possible to pulverize the pellets obtained to give particles having a smaller particle diameter. Whichever method described above is used, it is important in the invention that the polymer in a molten state should be cooled to room temperature as rapidly as possible in order to prevent the crystal structure thereof from growing. Examples of techniques for this include a method in which the polymer in a molten state is brought into contact as rapidly as possible with a low-temperature fluid having a high specific heat, e.g., water.

In the invention, the melt polymerization polymer obtained in the manner shown above is subjected to solid-phase polycondensation to produce a polyester resin. The apparent crystallite size ($ACS_{010}$) of this melt polymerization polymer to be subjected to solid-phase polycondensation, which has been obtained through cooling, is smaller than 9 nm, preferably 8 nm or smaller, more preferably 7 nm or smaller. In case where the apparent crystallite size of the melt polymerization polymer is 9 nm or larger, the rate of solid-phase polycondensation is low. The smaller the crystallite size of the melt polymerization polymer is preferred from the standpoint of keeping the initial reaction rate in the solid-phase polycondensation as high as possible. The lower limit thereof is 0.

Apparent crystallite size is a parameter indicating the size of a crystal structure, and this term herein means the apparent crystallite size ($ACS_{010}$) concerning (010) reflection determined by analyzing a wide-angle X-ray diffraction spectrum.

Furthermore, the intrinsic viscosity of the melt polymerization polymer in the invention is from 0.08 dL/g to 0.50 dL/g. It is preferably 0.1 dL/g or higher, more preferably 0.15 dL/g or higher, especially preferably 0.20 dL/g or higher. On the other hand, it is preferably 0.45 dL/g or lower, especially preferably 0.40 dL/g or lower. In case where the intrinsic viscosity thereof is lower than 0.08 dL/g, the polycondensation rate in the subsequent solid-phase polycondensation is exceedingly low. In case where the intrinsic viscosity thereof is higher than 0.50 dL/g, not only an expensive apparatus for melt polycondensation is necessary for imparting such an increased intrinsic viscosity to the polymer, but also the melt polycondensation takes much time for increasing the degree of polymerization to a value corresponding to that intrinsic viscosity, resulting in a prolonged time period required for production.

Examples of techniques for regulating the apparent crystallite size of the melt polymerization polymer to a value in the range shown above include a method in which the melt polymerization polymer in a molten state is rapidly cooled as stated above, i.e., the rate of cooling is increased as much as possible. The rate of cooling cannot be unconditionally specified because the rate of crystallization varies with the molecular weight of the melt polymerization polymer. It is, however, desirable to cool the melt polymerization polymer in a molten state to or below the crystallization temperature thereof in 10 seconds, preferably in 5 seconds, more preferably in 1 second. Regulating the intrinsic viscosity to a value in the range shown above can be accomplished by controlling the temperature and time of polycondensation and the degree of vacuum.

The intrinsic-viscosity range for the melt polymerization polymer according to the invention is lower than the viscosity range for melt polymerization polymers in ordinary use. Consequently, the target intrinsic viscosity can be attained at a lower temperature in a shorter time period using a lower degree of vacuum. Since side reactions are inhibited, satisfactory product quality is obtained. Furthermore, since the process can be simplified, there also is a merit that low-cost production is possible.

The acid value of the melt polymerization polymer is in the range of usually from 10 to 1,000 mmol/kg. The content of cyclic trimers therein is in the range of usually from 4,000 to 12,000 ppm.

Incidentally, the average particle diameter of the particulate melt polymerization polymer to be subjected to solid-phase polycondensation is preferably 10 μm or larger, more preferably 50 μm or larger, especially preferably 100 μm or larger. On the other hand, it is preferably 1,500 μm or smaller, more preferably 1,300 μm or smaller, even more preferably 1,000 μm or smaller, especially preferably 500 μm or smaller. In case where the average particle diameter thereof exceeds 1,500 μm, the rate of solid-phase polycondensation tends to be low. On the other hand, average particle diameters thereof smaller than 10 μm tend to pose a problem that scattering into the air is apt to occur.

The melt polymerization polymer obtained in the manner described above, in which the amount of comonomer units other than terephthalic acid units and ethylene glycol units is 5.5 or less and which has an intrinsic viscosity of from 0.08 to 0.50 dL/g and an apparent crystallite size ($ACS_{010}$) smaller than 9 nm, is subsequently subjected to solid-phase polycondensation while keeping the apparent crystallite size ($ACS_{010}$) smaller than 9 nm. Preferably, the melt polymerization polymer having an apparent crystallite size ($ACS_{010}$) of 8 nm or smaller is subjected to solid-phase polycondensation while keeping the crystallite size ($ACS_{010}$) at 8 nm or smaller, more preferably at 7 nm or smaller. That the solid-phase polycondensation has been conducted while keeping the crystallite size ($ACS_{010}$) smaller than 9 nm can be ascertained from the fact that the polyester obtained through the solid-phase polycondensation has a crystallite size ($ACS_{010}$) smaller than 9 nm. Furthermore, that the solid-phase polycondensation has been conducted while keeping the crystallite size ($ACS_{010}$) at 8 nm or smaller can be ascertained from the fact that the polyester obtained through the solid-phase polycondensation has a crystallite size ($ACS_{010}$) of 8 nm or smaller.

Incidentally, there are cases where in the course of the heating of the melt polymerization polymer to a temperature for solid-phase polycondensation, crystallization proceeds in the surface of the melt polymerization polymer under some conditions for the heating to the solid-phase polycondensation temperature, for example, depending on the selection of a heating rate. For example, the crystallization proceeds when the polymer is held at a temperature of 190° C. or lower for a given time period. However, moderate crystallization tends to prevent adhesion to the reactor and prevent the rate of solid-phase polycondensation from being reduced by the fusion bonding of the melt polymerization polymer to itself. Even when crystallization of the surface of the melt polymerization polymer is conducted in the course of heating, the polymer should undergo a minimum necessary heat history so as to minimize the decrease in the rate of solid-phase polycondensation to be subsequently conducted and thereby regulate the polyester resin to be obtained through the solid-phase polycondensation so as to retain an apparent crystallite size smaller than 9 nm.

The temperature for the solid-phase polycondensation according to the invention is higher by at least 140° C. than the glass transition temperature of the melt polymerization polymer and is not higher than the melting point of the polymer. Preferably, the polycondensation temperature is higher by at least 145° C. than the glass transition temperature of the melt polymerization polymer and is not higher than the melting point of the polymer. More preferably, the polycondensation temperature is higher by at least 150° C., especially preferably at least 160° C., than the glass transition temperature of the melt polymerization polymer and is not higher than the melting point of the melt polymerization polymer. When solid-phase polycondensation is conducted at a temperature within that range, the solid-phase polycondensation can be caused to proceed efficiently while minimizing the progress of crystallization. In case where the solid-phase polycondensation temperature is lower than the lower limit, the rate of polycondensation is low, resulting in poor productivity.

In case where the polycondensation temperature exceeds the range, the melt polymerization polymer melts to pose problems, for example, that the polymer is fusion-bonded to itself and the polymer adheres to the reactor, resulting in poor product quality or poor productivity. The solid-phase polycondensation is conducted usually in an inert gas atmosphere for a period of up to about 10 hours while optionally keeping the melt polymerization polymer flowing or in a similar state in order to prevent the polymer particles from adhering to one another. The term melting point herein means the temperature corresponding to the top of the melting peak which is shown by a sample (melt polymerization polymer) in heating at a rate of 20° C./min with a differential scanning calorimeter.

This solid-phase polycondensation can further heighten the degree of polymerization and can diminish oligomers, acetaldehyde, and the like to some degree. The solid-phase polycondensation may be conducted at a reduced pressure of about from 1,333 to 13.3 Pa. However, in industrial production on a scale which is large in some degree, use of such a reduced pressure results in an increased cost of equipment including a pressure-reducing apparatus and a solid-phase polycondensation vessel, and it is preferred to conduct the polycondensation at a pressure around ordinary pressure, especially from 100 kPa to 150 kPa, from the standpoint of profitability.

Although the solid-phase polycondensation in the invention is conducted at the temperature shown above, the heating of the melt polymerization polymer to be subjected to the solid-phase polycondensation to the solid-phase polycondensation temperature is preferably conducted at a heating rate of 100° C./min or lower until the polymer temperature reaches at least 200° C. More preferably, the polymer is-heated at a rate of 100° C./min or lower until the polymer temperature reaches at least 180° C. The reasons for this are as follows. Since poly(ethylene terephthalate), for example, undergoes high-rate crystallization at around 180° C., rapid heating in this range results in the rapid growth of crystallites and in an increased crystallite size. Namely, such rapid heating tends to raise difficulties in maintaining the crystallite size specified in the invention.

As a result, the rate of solid-phase polycondensation becomes low. The reason why the rate of solid-phase polycondensation decreases with increasing crystallite size may be that the increased crystallite size restrains the movement of the ends of molecular chains present in the amorphous region and, hence, the frequency of the approach of molecular ends to one another at a distance which enables the ends to react with each other becomes low.

The intrinsic viscosity of the polyester resin obtained by the solid-phase polycondensation is usually 0.60 dL/g or higher, preferably 0.65 dL/g or higher, more preferably 0.70 dL/g or higher. Furthermore, it is usually 1.20 dL/g or lower, preferably 1.10 dL/g or lower, more preferably 1.00 dL/g or lower. In case where the intrinsic viscosity thereof is lower than 0.60 dL/g, unevenness of wall thickness is apt to occur especially when the resin is used in blow molding. In case where the intrinsic viscosity thereof is higher than 1.20 dL/g, shape failures (sink marks) are apt to generate due to insufficiency of resin packing into the mold especially in injection molding.

Furthermore, the concentration of acid terminals in the polyester resin obtained by the solid-phase polycondensation is usually from 5 mmol/kg to 100 mmol/kg. The amount of cyclic trimers contained in the resin is usually from 1,500 ppm to 8,000 ppm.

The average particle diameter of the polyester resin obtained by the solid-phase polymerization depends on the average particle diameter of the melt polymerization polymer, and is preferably 10 μm or larger, more preferably 50 μm or larger, especially preferably 100 μm or larger. On the other hand, it is preferably 1,500 μm or smaller, more preferably 1,300 μm or smaller, even more preferably 1,000 μm or smaller, especially preferably 500 μm or smaller.

Incidentally, the particulate polyester resin obtained by the solid-phase polycondensation may be formed into particles suitable for handling, e.g., granules, according to need.

EXAMPLES

The invention will be explained below in more detail by reference to Examples. However, the invention should not be construed as being limited to the following Examples unless it departs from the spirit-thereof. In the following Examples, all "parts" are by weight. Methods used in the invention for determining various properties are as follows.

(1) Apparent Crystallite Size ($ACS_{010}$)

A sample was examined for a wide-angle X-ray scattering spectrum. The angle of diffraction θ from the (010) plane, full width at half height $β_{010}$ for the peak of the diffraction, wavelength λ of the X-ray, and constant K (assumed to be 1) were introduced into the following equation 1 to thereby calculate the crystallite size.

Although the average crystallite size was thus determined through wide-angle X-ray powder diffraction, the method or procedure for the measurement is as follows.

(Sample Preparation)

A polyester sample was freeze-pulverized and then placed in a doughnut-shaped metallic spacer having a thickness of about 1 mm and having a 8 μm-thick polyimide film applied on one side thereof. The powder in the spacer was lightly compacted by pressing from the side opposite to the polyimide-covered side to obtain a test sample having a thickness of about 1 mm.

(Examination Conditions)

X-ray generator: URTRAX18 [40 kV, 250 mA]; Rigaku Corp.

Target: $CuK_α$

Detector: scintillation counter

Examination method: symmetric transmission method

Collimator: 1 mmφ

Light-receiving slit: 1°

Scanning mode: 2θ=5–35° was scanned at 0.05°/step. The integrated time period for each step was 5 seconds.

(Calculation of $ACS_{010}$)

a. The scattering attributable to the polyimide film used for the examination is subtracted from the diffraction profile for the sample.

b. The date obtained through the examination are subjected to the Lorenz correction.

c. A straight line extending from 2θ=15.00° to 2θ=19.00° is supposed and subtracted as background scattering in the region of 2θ=15°–19°.

d. Overlapping in the 15°–19° region is separated into two peaks for (010) and (011), assuming that the distribution is a Gauss distribution, and the position, full width at half height, and height of the (010) peak are determined and introduced into the following equation 1 to calculate $ACS_{010}$. K was supposed to be 1.0.

Incidentally, λ is the wavelength [Å] of the X-ray, $β_{010}$ is the full width at half height [rad] of the (010) peak, and $θ_{010}$ is the diffraction angle [rad] for the (010) peak.

$$ASC_{010} = \frac{K \cdot \lambda}{\beta_{010} \cdot \cos\theta_{010}} \quad \text{(equation 1)}$$

(2) Glass Transition Temperature (Tg)

Using differential scanning calorimeter DSC 220C, manufactured by Seiko Instruments Inc., a sample was heated to 300° C. and then held for 10 minutes. The sample pan was taken out of the cell, rapidly cooled in liquid nitrogen, and then returned to the cell. The sample was then heated at a rate of 20° C./min to measure the glass transition temperature thereof.

(3) Intrinsic Viscosity (IV)

a. A 0.25-g portion of a freeze-pulverized resin sample was dissolved in a phenol/tetrachloroethane (1/1 by weight) mixed solvent in a concentration (c) of 1.0 g/dL with stirring at 140° C. for 30 minutes. Thereafter, the relative viscosity (ηrel) of this solution to the solvent was measured with a Ubbelohde's capillary viscometer at 30° C.

b. The ratio (ηsp/c) of the specific viscosity (ηsp), which was determined by subtracting 1 from the relative viscosity (ηrel), to the concentration (c) was determined.

c. The concentration (c) was changed to 0.5 g/dL, 0.2 g/dL, and 0.1 g/dL, and the ratio (ηsp/c) in each case was determined in the same manner.

d. The concentration (c) was extrapolated to 0 and the ratio (ηsp/c) in this case was determined as intrinsic viscosity [η] (dL/g) from those values.

(4) Average Particle Diameter

A cumulative distribution curve was drawn by the method as provided for in JIS K 0069, and the value corresponding to a cumulative percentage of 50% was taken as the average particle diameter.

(5) Amount of Comonomer Unit

A solution prepared by dissolving a sample in trifluoroacetic acid was analyzed by 1H-NMR spectroscopy with a nuclear magnetic resonance apparatus ("Type JNM-EX270"; JEOL Ltd.). Each peak was assigned. From the integrated values for peaks, the proportion in terms of mol % (A) of units of any dicarboxylic acid component other than terephthalic acid or its ester-forming derivative to all carboxylic acid component units and the proportion in terms of mol % (B) of units of any diol component other than ethylene glycol to all diol component units were calculated. The sum of these (A+B) was calculated.

(6) Occurrence or Nonoccurrence of Fusion Bonding

After a melt polymerization polymer had been subjected to solid-phase polycondensation, the resultant polyester resin was cooled to room temperature and recovered from the metallic plate. The peelability of this resin in the recovery is indicated in Table 1 by A, B, or C.

A: The polyester resin was only slightly adherent to the metallic plate and could be easily peeled off.

B: The polyester resin was adherent to the metallic plate but could be easily peeled off.

C: The polyester was tenaciously adherent to the metallic plate and was difficult to peel off.

Example 1

Terephthalic acid and ethylene glycol were continuously fed to a slurry preparation tank in such a proportion as to result in an amount of a terephthalic acid of 13.0 parts and an amount of an ethylene glycol of 5.82 parts to thereby prepare a slurry. The slurry was continuously fed to a first-stage esterification vessel and continuously esterified at 260° C. and about ordinary pressure to prepare bis(2-hydroxyethyl) terephthalate and low polymers thereof, which had a conversion into ester of 84%. This reaction mixture was continuously fed to a second-stage esterification vessel and continuously reacted at 255° C. and about ordinary pressure to obtain bis(2-hydroxyethyl) terephthalate and low polymers thereof, which had a conversion into ester of 95%.

Furthermore, the reaction mixture was continuously fed to a first-stage polycondensation vessel, and 0.011 part of orthophosphoric acid and 0.038 parts of diantimony trioxide were continuously added to the reaction mixture. The reaction mixture was continuously reacted at 280° C. and a reduced pressure of from 2 to 4 kPa for a residence time of about 1 hour. Subsequently, the reaction mixture in the first-stage polycondensation vessel was continuously fed to a second-stage polycondensation vessel to continuously conduct polycondensation at 280° C. and a reduced pressure of from 200 to 400 Pa for a residence time of about 1 hour.

The product of polycondensation obtained was continuously discharged in the form of strands into water and pelletized. These pellets were transparent and had undergone substantially no crystallization. The pellets obtained were pulverized with a rotary mill to obtain a pulverized product (melt polymerization polymer as a feed material for solid-phase polycondensation). Results of analyses of the feed material for solid-phase polycondensation (melt polymerization polymer) are shown in Table 1 in the column "Feed material for solid-phase polycondensation".

Subsequently, 1 g of the pulverized product was evenly spread on a metallic plate 30 cm square. In a 50 L/min nitrogen stream in an oven, this pulverized product was held still at 120° C. for 2 hours, subsequently heated to 170° C. over 30 minutes, and then held at 170° C. for 2 hours. Furthermore, the pulverized product was heated to 250° C. over 10 minutes and held at 250° C. for 10 minutes to conduct solid-phase polycondensation. Thereafter, the metallic plate was cooled from 250° C. to room temperature; this cooling was conducted by switching off the heater while continuing the nitrogen introduction. The time period required for the temperature in the oven to decline from 250° C. to 200° C. was 25 minutes. Results of analyses of the polymer obtained are shown in Table 1 in the column "Product".

Example 2

A pulverized product (feed material for solid-phase polycondensation (melt polymerization polymer) ) was obtained in the same manner as in Example 1, except that 0.000135 parts of ethyl acid phosphate, 0.000794 parts of magnesium acetate tetrahydrate, and 0.00213 parts of tetrabutoxytitanium were continuously supplied to the first-stage polycondensation vessel in place of the orthophosphoric acid and diantimony trioxide. Results of analyses of the feed material for solid-phase polycondensation (melt polymerization polymer) are shown in Table 1 in the column "Feed material for solid-phase polycondensation". Subsequently, solid-phase polycondensation was conducted in the same manner as in Example 1, except that the solid-phase polycondensation temperature and solid-phase polycondensation time shown in Table 1 were used. Results of analyses of the polymer obtained are shown in Table 1 in the-column "Product".

Example 3

A pulverized product (feed material for solid-phase polycondensation (melt polymerization polymer) ) was obtained in the same manner as in Example 2, except that the amount of tetrabutoxytitanium was changed to 0.00324 parts. Results of analyses of the feed material for solid-phase polycondensation (melt polymerization polymer) are shown in Table 1 in the column "Feed material for solid-phase polycondensation". Subsequently, solid-phase polycondensation was conducted in the same manner as in Example 1, except that the solid-phase polycondensation temperature and solid-phase polycondensation time shown in Table 1 were used. Results of analyses of the polymer obtained are shown in Table 1 in the column "Product".

Example 4

A pulverized product (feed material for solid-phase polycondensation (melt polymerization polymer) ) was obtained in the same manner as in Example 3, except that 0.34 parts of isophthalic acid and 12.7 parts of terephthalic acid were continuously fed to the slurry preparation tank in place of 13 parts of terephthalic acid. Results of analyses of the feed material for solid-phase polycondensation (melt polymerization polymer) are shown in Table 1 in the column "Feed material for solid-phase polycondensation". Subsequently, solid-phase polycondensation was conducted in the same manner as in Example 1, except that the solid-phase polycondensation temperature and solid-phase polycondensation time shown in Table 1 were used. Results of analyses of the polymer obtained are shown in Table 1 in the column "Product".

Example 5

A pulverized product (feed material for solid-phase polycondensation (melt polymerization polymer) ) was obtained in the same manner as in Example 3, except that the time period of the polycondensation conducted at 280° C. and a reduced pressure of from 200 to 400 Pa was prolonged, and that a freeze pulverizer was used for pulverization. Results of analyses of the feed material for solid-phase polycondensation (melt polymerization polymer) are shown in Table 1 in the column "Feed material for solid-phase poly condensation". Subsequently, solid-phase polycondensation was conducted in the same manner as in Example 1, except that the solid-phase polycondensation temperature and solid-phase polycondensation time shown in Table 1 were used. Results of analyses of the polymer obtained are shown in Table 1 in the column "Product".

Example 6

A pulverized product (feed material for solid-phase polycondensation (melt polymerization polymer)) was obtained in the same manner as in Example 3, except that the pulverization with a rotary mill was conducted for a shortened time period. Results of analyses of the feed material for solid-phase polycondensation (melt polymerization polymer) are shown in Table 1 in the column "Feed material for solid-phase polycondensation". Subsequently, solid-phase polycondensation was conducted in the same manner as in Example 1, except that the solid-phase polycondensation temperature and solid-phase polycondensation time shown in Table 1 were used. Results of analyses of the polymer obtained are shown in Table 1 in the column "Product".

Example 7

One gram of the pulverized product (feed material for solid-phase polycondensation (melt polymerization polymer)) obtained in Example 3 was evenly spread on a metallic plate 30 cm square. In a 50 L/min nitrogen stream in an oven, this metallic plate was held still at 120° C. for 2 hours, subsequently heated to 170° C. over 30 minutes, and then held at 170° C. for 30 minutes. This pulverized product was once cooled to room temperature and recovered. The pulverized product recovered was used as a feed material for solid-phase polycondensation (melt-polymerization polymer) to conduct solid-phase polycondensation in the same manner as in Example 1. Results of analyses of the polymer obtained are shown in Table 1 in the column "Product".

Comparative Example 1

Esterification and polycondensation were conducted in the same manner as in Example 1.
About 50 g of the product of the polycondensation was discharged through a nozzle attached to the bottom of the polycondensation vessel onto a hot plate kept at 180±1° C., in such a manner that the height of the resultant polycondensation product layer on the hot plate was up to 2 mm from the hot-plate surface. This polycondensation product was held for 5 minutes to cause crystallization. The crystallization product obtained was pulverized with a coffee mill to obtain a pulverized product (feed material for solid-phase polycondensation (melt polymerization polymer)). Results of analyses of the feed material for solid-phase polycondensation (melt polymerization polymer) are shown in Table 1 in the column "Feed material for solid-phase polycondensation".

Subsequently, the pulverized product was subjected to solid-phase polycondensation in the same manner as in Example 1. Results of analyses of the polymer obtained are shown in Table 1 in the column "Product".

The polymer obtained had a lower intrinsic viscosity although the solid-phase polycondensation time was the same as in Example 1. This indicates that the rate of polycondensation was low.

Comparative Example 2

Esterification and polycondensation were conducted in the same manner as in Example 2. Thereafter, the product of polycondensation obtained was treated in the same manner as in Comparative Example 1 to obtain a pulverized product (feed material for solid-phase polycondensation (melt polymerization polymer)). Results of analyses of the feed material for solid-phase polycondensation (melt polymerization polymer) are shown in Table 1 in the column "Feed material for solid-phase polycondensation".

Subsequently, the pulverized product was subjected to solid-phase polycondensation in the same manner as in Example 1. Results of analyses of the polymer obtained are shown in Table 1 in the column "Product".

The polymer obtained had a lower intrinsic viscosity although the solid-phase polycondensation time was the same as in Example 2. This indicates that the rate of polycondensation was low.

Comparative Example 3

A pulverized product (feed material for solid-phase polycondensation (melt polymerization polymer)) was obtained in the same manner as in Example 3, except that 0.73 parts of isophthalic acid and 12.3 parts of terephthalic acid were continuously fed to the slurry preparation tank in place of 13 parts of terephthalic acid. Results of analyses of the feed material for solid-phase polycondensation (melt polymerization polymer) are shown in Table 1 in the column "Feed material for solid-phase polycondensation". Subsequently, solid-phase polycondensation was conducted in the same manner as in Example 1, except that the solid-phase polycondensation temperature and solid-phase polycondensation time shown in Table 1 were used. Results of analyses of the polymer obtained are shown in Table 1 in the column "Product".

Comparative Example 4

The pulverized product (feed material for solid-phase polycondensation (melt polymerization polymer)) obtained in Example 3 was subjected to solid-phase polycondensation in the same manner as in Example 1, except that the solid-phase polycondensation temperature and solid-phase polycondensation time shown in Table 1 were used. Results of analyses of the polymer obtained are shown in Table 1 in the column "Product".

TABLE 1

| | Feed material for solid-phase polycondensation | | | | | | Solid-phase polycondensation temperature ° C. | Solid-phase polycondensation time min | Occurrence of non- occurrence of fusion bonding (adhesion to metallic plate) | Product | |
|---|---|---|---|---|---|---|---|---|---|---|---|
| | Intrinsic viscosity (IV) dL/g | ACS nm | Amount of Comonomer unit | Tg ° C. | Shape | Average particle diameter μm | | | | Intrinsic viscosity (IV) dL/g | ACS nm |
| Ex. 1 | 0.29 | 0 | 1.9 | 78 | powder | 230 | 250 | 10 | B | 0.98 | 8.7 |
| Ex. 2 | 0.22 | 0 | 1.8 | 78 | powder | 130 | 230 | 30 | A | 0.75 | 8.8 |
| Ex. 3 | 0.33 | 0 | 2.4 | 78 | powder | 130 | 240 | 30 | A | 0.78 | 8.1 |
| Ex. 4 | 0.33 | 0 | 5.0 | 75 | powder | 130 | 240 | 30 | B | 0.81 | 7.9 |
| Ex. 5 | 0.49 | 0 | 2.0 | 78 | powder | 130 | 240 | 10 | A | 0.99 | 7.8 |
| Ex. 6 | 0.33 | 0 | 2.4 | 78 | powder | 1260 | 250 | 30 | B | 0.64 | 8.2 |
| Ex. 7 | 0.31 | 6.2 | 2.4 | 78 | powder | 130 | 240 | 30 | A | 0.71 | 8.3 |
| Comp. Ex. 1 | 0.29 | 11.0 | 1.9 | 78 | powder | 220 | 250 | 10 | B | 0.52 | 11.9 |
| Comp. Ex. 2 | 0.22 | 10.8 | 1.8 | 78 | powder | 130 | 230 | 30 | A | 0.59 | 11.3 |
| Comp. Ex. 3 | 0.33 | 0 | 8.0 | 72 | powder | 130 | 240 | 30 | C | 0.88 | 7.6 |
| Comp. Ex. 4 | 0.33 | 0 | 2.4 | 78 | powder | 130 | 210 | 30 | A | 0.44 | 7.5 |

While the invention has been described in detail and with reference to specific embodiments thereof, it will be apparent to one skilled in the art that various changes and modifications can be made therein without departing from the spirit and scope thereof.

This application is based on a Japanese patent application filed on Jun. 12, 2002 (Application No. 2002-171708), the contents thereof being herein incorporated by reference.

INDUSTRIAL APPLICABILITY

According to the process of the invention, a high rate of solid-phase polycondensation is attained and a high-molecular polyester resin can be obtained exceedingly speedily.

Furthermore, according to the process of the invention, the solid-phase polycondensation of a polyester can be carried out at a high rate without the necessity of using special conditions, e.g., high vacuum. In addition, the process is free from problems concerning handling, such as, e.g., the fusion bonding of the resultant polyester resin to itself and the adhesion of the polyester resin to the reactor. A polyester can hence be industrially advantageously produced with satisfactory productivity.

The invention claimed is:

1. A process for producing a polyester resin, which comprises:
   polycondensing a dicarboxylic acid component containing terephthalic acid or an ester-forming derivative thereof as the main component and a diol component containing ethylene glycol as the main component, wherein the reacting components contain comonomers other than terephthalic acid and ethylene glycol in total amount of 5.5 mol % or less, by esterification or transesterification;
   melt polymerizing the polycondensed material obtained, thereby obtaining a polymerized product having an intrinsic viscosity ranging from 0.08 dL/g to 0.50 dL/g and an apparent crystallite size smaller than 9 nm; and
   solid-phase polycondensing the melt polymerized product obtained at a temperature which is higher by at least 140° C. than the glass transition temperature of the melt polymerization polymer and is not higher than the melting point of the polymer to thereby obtain a polyester resin having an apparent crystallite size smaller than 9 nm and having an intrinsic viscosity of 0.60 dL/g or higher.

2. The process for producing a polyester resin according to claim 1, wherein the solid-phase polycondensation reaction is conducted at a temperature which is higher by at least 145° C. than the glass transition temperature of the melt polymerization polymer and is not higher than the melting point of the polymer.

3. The process for producing a polyester resin according to claim 2, wherein the solid-phase polycondensation reaction is conducted at a temperature which is higher by at least 150° C. than the glass transition temperature of the melt polymerization polymer and is not higher than the melting point of the polymer.

4. The process for producing a polyester resin according to claim 1, wherein the melt polymerization polymer has an apparent crystallite size of 8 nm or smaller and the polyester resin has an apparent crystallite size of 8 nm or smaller.

5. The process for producing a polyester resin according to claim 1, wherein the melt polymerization polymer has an intrinsic viscosity ranging from 0.10 dL/g to 0.45 dL/g.

6. The process for producing a polyester resin according to claim 1, wherein the amount of comonomer units other than terephthalic acid units and ethylene glycol units is 4.5 or less.

7. The process for producing a polyester resin according to claim 1, wherein the melt polymerization polymer has an average particle diameter ranging from 10 to 1,500 μm.

8. The process for producing a polyester resin according to claim 1, wherein the polyester resin has an average particle diameter ranging from 10 to 1,500μm.

9. The process for producing a polyester resin according to claim 1, wherein the melt polymerization polymer is heated to the solid-phase polycondensation temperature at a rate of 100° C./min or less in heating the polymer to 200° C.

10. The process for producing a polyester resin according to claim 1, wherein the proportion of the diol component to the dicarboxylic acid component (molar ratio) ranges from 1 to 2 times.

11. The process for producing a polyester resin according to claim 1, wherein melt polymerization is conducted at a temperature of 250 to 290° C.

12. The process for producing a polyester resin according to claim 1, wherein melt polymerization is conducted at a pressure ranging from 1,333 to 13.3 Pa.

13. The process for producing a polyester resin according to claim 1, wherein the solid-phase polycondensation is conducted at a pressure ranging from 100 to 150 kPa.

14. The process for producing a polyester resin according to claim 1, wherein the polycondensation is conducted in the presence of a titanium compound as a catalyst.

* * * * *